US011485073B2

(12) United States Patent
Voiron

(10) Patent No.: US 11,485,073 B2
(45) Date of Patent: Nov. 1, 2022

(54) METHOD FOR CREATING AN AIRCRAFT TURBOMACHINE VANE USING ADDITIVE MANUFACTURING

(71) Applicant: SAFRAN AIRCRAFT ENGINES, Paris (FR)

(72) Inventor: Mickaël Voiron, Moissy-Cramayel (FR)

(73) Assignee: SAFRAN AIRCRAFT ENGINES, Paris (FR)

(*) Notice: Subject to any disclaimer, the term of this patent is extended or adjusted under 35 U.S.C. 154(b) by 151 days.

(21) Appl. No.: 16/614,306

(22) PCT Filed: May 16, 2018

(86) PCT No.: PCT/EP2018/062794
§ 371 (c)(1),
(2) Date: Nov. 15, 2019

(87) PCT Pub. No.: WO2018/210957
PCT Pub. Date: Nov. 22, 2018

(65) Prior Publication Data
US 2021/0154923 A1 May 27, 2021

(30) Foreign Application Priority Data
May 19, 2017 (FR) ...................................... 1754446

(51) Int. Cl.
*B29C 64/153* (2017.01)
*B22F 10/00* (2021.01)
(Continued)

(52) U.S. Cl.
CPC ............ *B29C 64/153* (2017.08); *B22F 10/00* (2021.01); *B33Y 10/00* (2014.12); *B33Y 80/00* (2014.12);
(Continued)

(58) Field of Classification Search
CPC ....... B29C 64/153; B29C 64/40; B22F 5/003; B22F 10/00; B22F 10/20; B22F 10/40;
(Continued)

(56) References Cited

U.S. PATENT DOCUMENTS 8,684,069 B2  4/2014 Mottin et al.
9,707,718 B2  7/2017 Vilaro et al.
(Continued)

FOREIGN PATENT DOCUMENTS

FR  2 991 613 A1  12/2013
FR  3002167 A1   8/2014
(Continued)

OTHER PUBLICATIONS

International Search Report dated Jul. 9, 2018, issued in corresponding International Application No. PCT/EP2018/062794, filed May 16, 2018, 7 pages.
(Continued)

Primary Examiner — Eric J Zamora Alvarez
(74) Attorney, Agent, or Firm — Christensen O'Connor Johnson Kindness PLLC

(57) ABSTRACT

Methods for creating an aircraft turbomachine vane using additive manufacturing include additively manufacturing a vane on a bed of powder using selective laser melting, the additive manufacturing being performed on a support plate so that first or second circumferential edges are manufactured first directly on the support plate, at least one temporary support member being produced simultaneously with the first or second edges. The methods also include removing the temporary support member by breaking its connection with the leading or trailing edge with a tool that is engaged in at least one recess thereof.

9 Claims, 3 Drawing Sheets

(51) Int. Cl.
*B33Y 10/00* (2015.01)
*B33Y 80/00* (2015.01)
*B22F 10/40* (2021.01)
*F01D 9/02* (2006.01)

(52) U.S. Cl.
CPC .... *F05D 2220/323* (2013.01); *F05D 2230/22* (2013.01); *F05D 2230/31* (2013.01); *F05D 2240/121* (2013.01); *F05D 2240/122* (2013.01)

(58) Field of Classification Search
CPC ....... B22F 2003/241; B22F 2003/1042; B33Y 10/00; B33Y 80/00; F05D 2220/323; F05D 2230/22; F05D 2230/31; F05D 2240/121; F05D 2240/122
See application file for complete search history.

(56) References Cited

U.S. PATENT DOCUMENTS

| | | | |
|---|---|---|---|
| 10,744,713 B2* | 8/2020 | Fieldman | ............... B29C 64/40 |
| 2004/0031780 A1 | 2/2004 | Hagemeister et al. | |
| 2015/0145171 A1* | 5/2015 | Walker | ................... B29C 64/40 |
| | | | 264/401 |
| 2016/0130960 A1* | 5/2016 | Cortequisse | .............. F01D 9/06 |
| | | | 415/173.4 |
| 2018/0326495 A1 | 11/2018 | Dreano | |

FOREIGN PATENT DOCUMENTS

| | | |
|---|---|---|
| FR | 3 030 323 A1 | 6/2016 |
| WO | 2012001324 A1 | 1/2012 |
| WO | 2017085383 A1 | 5/2017 |

OTHER PUBLICATIONS

Written Opinion of the International Searching Authority dated Jul. 9, 2018, issued in corresponding International Application No. PCT/EP2018/062794, filed May 16, 2018, 6 pages.

International Preliminary Report on Patentability dated Nov. 19, 2019, issued in corresponding International Application No. PCT/EP2018/062794, filed May 16, 2018, 1 page.

* cited by examiner

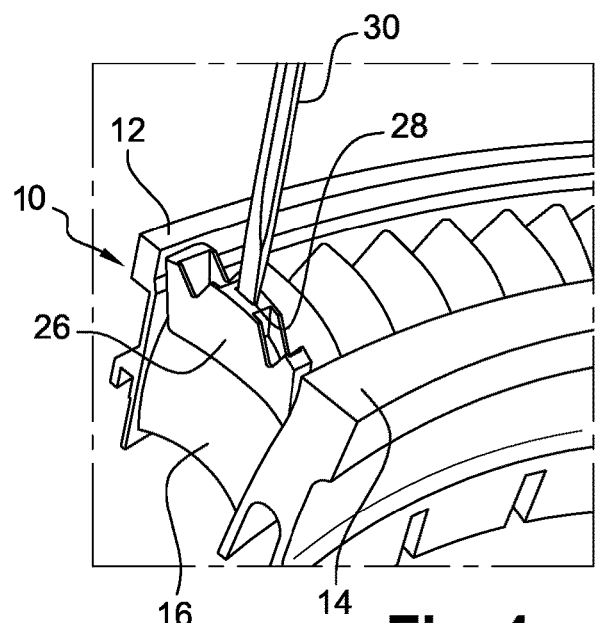
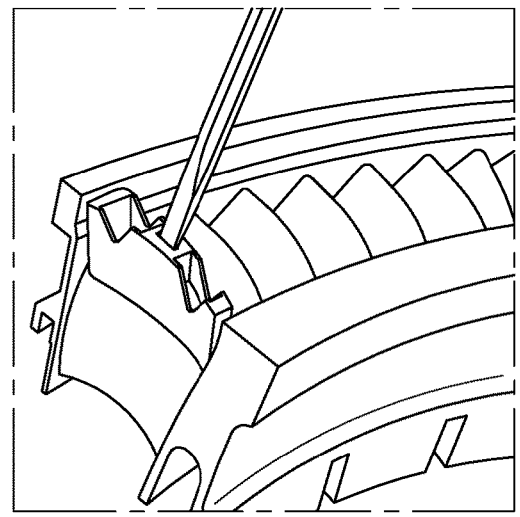
Fig. 4a   Fig. 4b
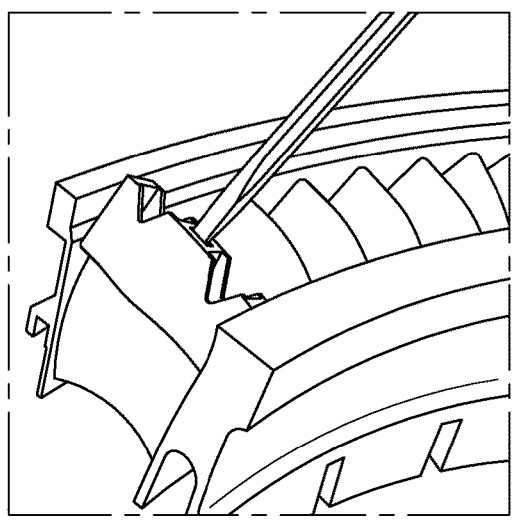
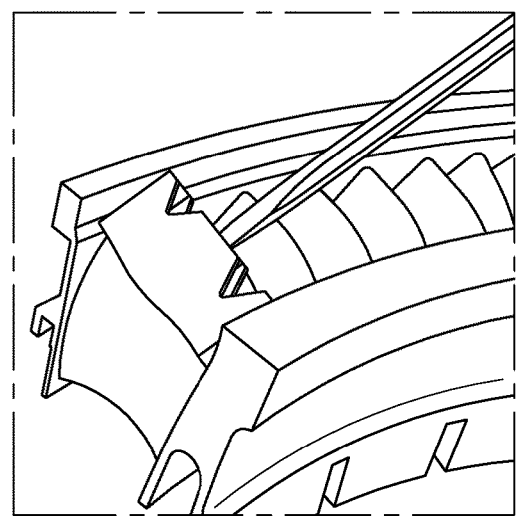
Fig. 4c   Fig. 4d

METHOD FOR CREATING AN AIRCRAFT TURBOMACHINE VANE USING ADDITIVE MANUFACTURING

TECHNICAL FIELD

This invention concerns a method for creating by additive manufacturing an aircraft turbomachine vane, which may be part of an aircraft turbomachine distributor or rectifier sector.

BACKGROUND

The prior art comprises documents FR-A1-2 991 613, FR-A1-3 030 323, WO-A1-2012/001324, US-A1-2004/031780 and FR-A1-3 002 167.

A turbomachine distributor sector comprises two circumferential walls, upper and lower respectively, between which vanes extend comprising each a leading edge and a trailing edge extending between the walls. The leading edges of the vanes are located on the side of first circumferential edges of the walls and can be at least partially retracted with respect to these circumferential edges. Similarly, the trailing edges of the vanes are located on the side of the second circumferential edges of the walls and can be at least partially retracted with respect to these circumferential edges.

In the event that such a distributor sector is produced by additive manufacturing, by laser fusion on powder beds, the distributor would be produced on a support plate so that either the first circumferential edges or the second circumferential edges will be produced first directly on the support plate. In such a case, due to the above-mentioned retracting, there would be a gap between all or part of the leading or trailing edge of each vane and the support plate. To avoid such gap, which could lead to subsidence of the material during manufacture, it would be possible to use temporary vane support members. These members would be produced simultaneously with the first or second edges, at the level of the vanes, and would extend between the support plate and the leading or trailing edges of the vanes.

However, these support members should be eliminated after manufacture. This raises the question of their elimination, by the simplest possible technique, without any risk of damage to the vanes and of the distributor sector. A solution consisting in using a gripper to grasp each support member, disengaging it from the corresponding vane by back and forth movement, then removing it with the gripper, would be possible. However, the operator's gesture would not be precise and, because of the geometry of the member and its low stiffness, it could deform under the force applied by the gripper, making it more difficult to remove.

The invention offers a simple, effective and economical solution to at least some of these problems.

SUMMARY OF THE INVENTION

The invention proposes a method of creating at least one vane (i.e. any aerodynamic profile element) of an aircraft turbomachine, using additive manufacturing, this vane comprising two circumferential walls, upper and lower respectively, between which extend at least one vane comprising each a leading edge and a trailing edge extending between said walls and at least partially retracted with respect to first and second circumferential edges of said walls, respectively, the method comprising:

an additive manufacturing step by laser fusion on powder beds of said vane, the manufacturing being carried out on a support plate so that said first or second circumferential edges are manufactured first directly on said support plate, at least one temporary support member being produced simultaneously with said first or second edges, at the level of said or each vane, and extending between said support plate and said leading or trailing edges of the vane, and a step of removing said or each supporting member by breaking its connection with the associated leading or trailing edge, characterized in that the removing is carried out by means of a tool, at least one end of which is engaged in at least one recess of said or each supporting member, and which is moved by pivoting in a plane substantially perpendicular to the associated leading or trailing edge.

The invention can be applied to a single vane, i.e. isolated, or a series of vanes forming a monoblock assembly called a sector. The sector can be a rectifier sector (for a compressor) or a distributor sector (for a turbine).

The invention allows to solve the above-mentioned problem. It allows to stiffen the support member but also to make its removal operation easier, faster and also less constraining for the operator. One of the problems was the lack of rigidity, as the walls of the member could collapse under the action of the gripper. The presence and conformation of the recess allow to simplify the shape of the member, which is thus stiffened.

The process according to the invention may comprise one or more of the following characteristics or steps, taken in isolation from or in combination with each other:

said tool is a screwdriver, preferably a flat end or head, each member comprises one to three recesses or more. The number of recesses depends, for example, on the contact surface between the support member and the vane, each member may comprise a main recess and two secondary recesses arranged on two opposite sides of the main recess, said main recess is delimited by walls thicker than those delimiting the secondary recesses; this allows the member to have sufficient strength when a removal force is applied, the method is applied to a series of vanes belonging to the same distributor or rectifier sector.

The present invention also concerns an aircraft turbomachine vane produced by the method described above, said vane comprising two circumferential walls, upper and lower respectively, between which extend at least one vane comprising each a leading edge and a trailing edge extending between said walls and at least partially retracted with respect to first and second circumferential edges of said walls respectively, at least one temporary support member being located at the level of the leading or trailing edge of said or each vane, and extending between a plane passing through said first or second edges and said leading or trailing edge of said or each vane, characterized in that said or each support member comprises at least one recess configured to receive at least one end of a tool, for pivoting removal of said member.

The vane according to the invention may comprise one or more of the following characteristics or steps, taken in isolation from each other or in combination with each other:

each member comprises one to three or recesses or more, the or each recess is delimited by transverse reinforcing walls, each member has a thickness that varies between one end located on the side of the lower wall and an opposite end located on the side of the upper wall, each member comprises at least one lightening cavity; this type of cavity can also reduce the melting time and the powder consumption during the additive manufacturing, each lightening cavity is delimited by side walls of the member which comprise lightening notches, said lightening notches each have a general V-shape; this configuration can allow to facilitate the removal of powder from the cavities during a de-powdering operation at the end of the additive manufacturing operation; it can also allow to reduce the melting time and the powder consumption.

DESCRIPTION OF THE FIGURES

The invention will be better understood and other details, characteristics and advantages of the invention will appear more clearly when reading the following description made by way of non-limiting example and by reference to the annexed drawings in which.

DETAILED DESCRIPTION

Figure 1:
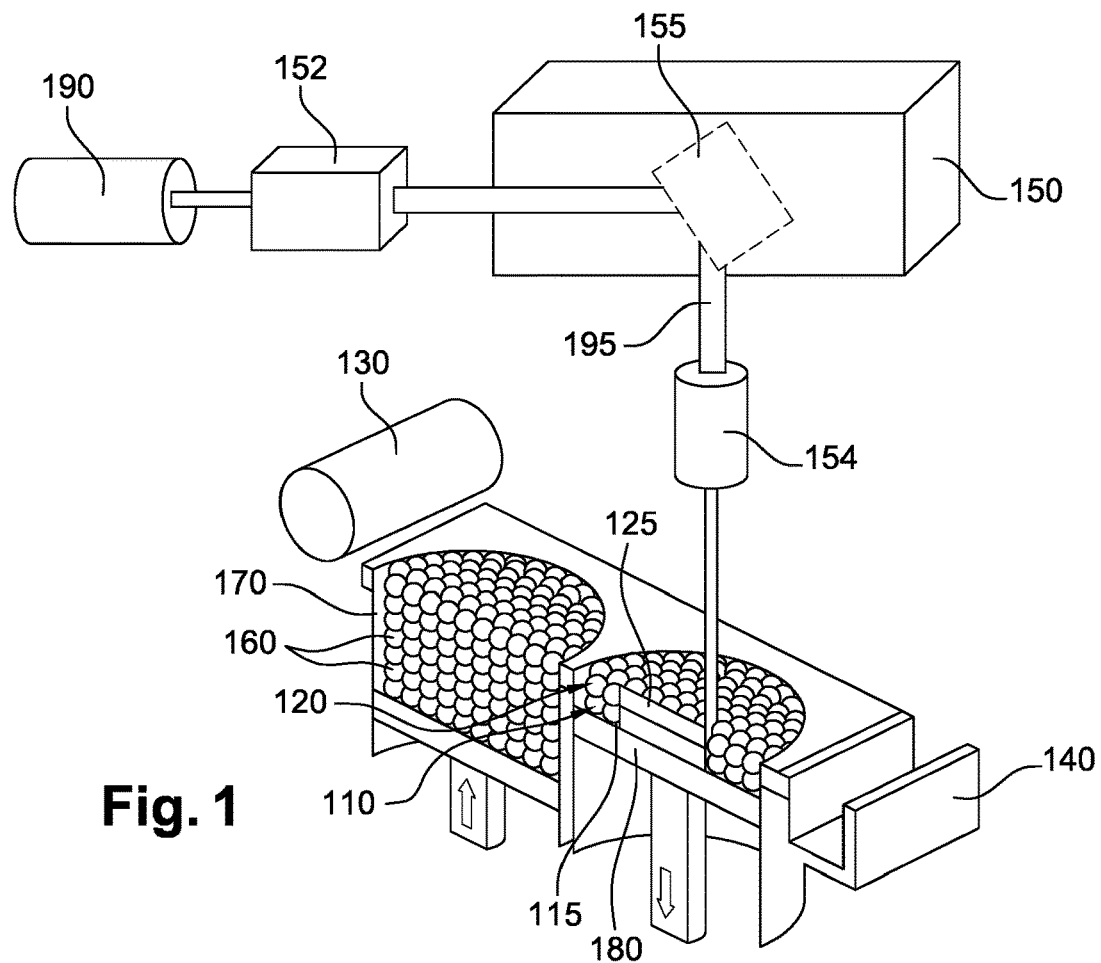
FIG. 1 is a very schematic view of a facility for the additive manufacturing of a compressor rectifier sector.

FIG. 1 shows an installation for creating a rectifier sector by additive manufacturing, and in particular by selective fusion of powder beds via a high energy beam, such as a laser beam.

The machine comprises a feeder tray 170 containing powder of a material such as a metal alloy, a roller 130 to transfer this powder from this tray 170 and spread a first layer 110 of this powder on a construction support tray 180.

The machine also includes a recycling tray 140 to recover the used powder (especially unfused or unsintered powder) and the excess powder (mostly), after spreading the powder layer on the support plate 180. Thus, most of the powder in the recycling tray is new powder. Also, this recycling tray 140 is commonly referred to by the profession as an overflow tray or ashtray.

This machine also comprises a generator 190 of energy beam (e.g. laser) 195, and a control system 150 capable of directing this beam 195 on any region of the support plate 180 so as to scan any region with a powder layer. The shaping of the energy beam (laser) and the variation of its diameter on the focal plane are done respectively by means of a beam dilator 152 and a focusing system 154, the whole constituting the optical system.

This machine to apply the method assimilable to a Direct Metal Deposition (DMD) method to a powder can use any high-energy beam instead of the laser beam 195, as long as this beam is energetic enough to in the first case melt or in the other case form collars or bridges between the powder particles and a part of the material on which the particles rest.

The roller 130 can be replaced by another suitable dispensing system, such as a dispenser (or hopper) associated with a wiper blade, a knife or a brush, capable of transferring and spreading the powder in a layer.

The control system 150 comprises, for example, at least one steerable mirror 155 on which the laser beam 195 is reflected before reaching a powder layer whose each point of the surface is always located at the same height with respect to the focusing lens, contained in the focusing system 154, the angular position of this mirror 155 being controlled by a galvanometric head so that the laser beam scans at least a region of the first powder layer, and thus follows a pre-established part profile.

This machine works as follows. A first layer 110 of powder of a material is applied to the support plate 180 with the aid of the roller 130, this powder being transferred from a feeder tray 170 during a forward movement of the roller 130 and then wiped, and possibly slightly compacted, during one (or more) return movement (s) of the roller 130. The excess powder is recovered in the recycling tray 140. A region of this first layer 110 of powder is scanned with the laser beam 195 to a temperature higher than the melting temperature of this powder (liquidus temperature). The galvanometric head is controlled according to the information contained in the database of the computer tool used for the computer-aided design and manufacture of the part to be manufactured. Thus, the powder particles 160 of this region of the first layer 110 are melted and form a first cord 115 in one piece, integral with the support plate 180. At this stage, several regions independent of this first layer can also be scanned with the laser beam to form, after melting and solidifying the material, several first cords 115 separated from each other. The support plate 180 is lowered by a height corresponding to the already defined thickness of the first layer (between 20 and 100 µm and generally by 30 to 50 µm). The thickness of the powder layer to be melted or consolidated remains a variable value from one layer to another because it is highly dependent on the porosity of the powder bed and its flatness, while the pre-programmed displacement of the support plate 180 is a value that cannot change except for the clearance. A second layer 120 of powder is then applied to the first layer 110 and to this first cord 115, and then a region of the second layer 120 which is partially or completely located above this first cord 115 is heated by exposure to the laser beam 195, so that the powder particles of this region of the second layer 120 are melted, with at least part of the first cord 115, and form a second cord in one piece or consolidated 125, all of these two cords 115 and 125 forming a block in one piece. For this purpose, the second cord 125 is advantageously already fully bound as soon as part of this second cord 125 binds to the first member 115. It is understood that depending on the profile of the part to be constructed, and in particular in the case of an undercut surface, the above-mentioned region of the first layer 110 may not lie, even partially, below the above-mentioned region of the second layer 120, so that in this case the first cord 115 and the second cord 125 do not form a block in one piece. This process of building the part layer by layer is then continued by adding additional layers of powder on the already formed assembly. The scanning with the beam 195 allows each layer to be constructed by giving it a shape in accordance with the geometry of the part to be produced, for example the above-mentioned lattice structures. The lower layers of the part cool more or less quickly as the upper layers of the part are built.

In order to reduce the contamination of the part, for example in dissolved oxygen, oxide(s) or another pollutant during its manufacturing layer by layer as described above, this manufacture must be carried out in an enclosure with a controlled degree of hygrometry and adapted to the method/material combination, filled with a neutral gas (non-reactive) against the material under consideration such as nitrogen (N2), argon (Ar) or helium (He) with or without the addition of a small quantity of hydrogen (H2) known for its reducing power. A mixture of at least two of these gases can also be considered. To prevent contamination, particularly by oxygen from the surrounding environment, it is customary to overpressure this enclosure.

Thus, selective fusion or selective laser sintering allows to build low-polluted parts with good dimensional accuracy, whose three-dimensional geometry can be complex.

Selective fusion or selective laser sintering also preferably uses powders of spherical morphology, clean (i.e. not contaminated by residual members from synthesis), very fine (the size of each particle is between 1 and 100 µm and preferably between 45 and 90 µm), which allows to obtain an excellent surface finish of the finished part.

Selective melting or selective laser sintering also reduces manufacturing times, costs and fixed costs compared to a part cast, injected or machined in the mass.

Figure 2:
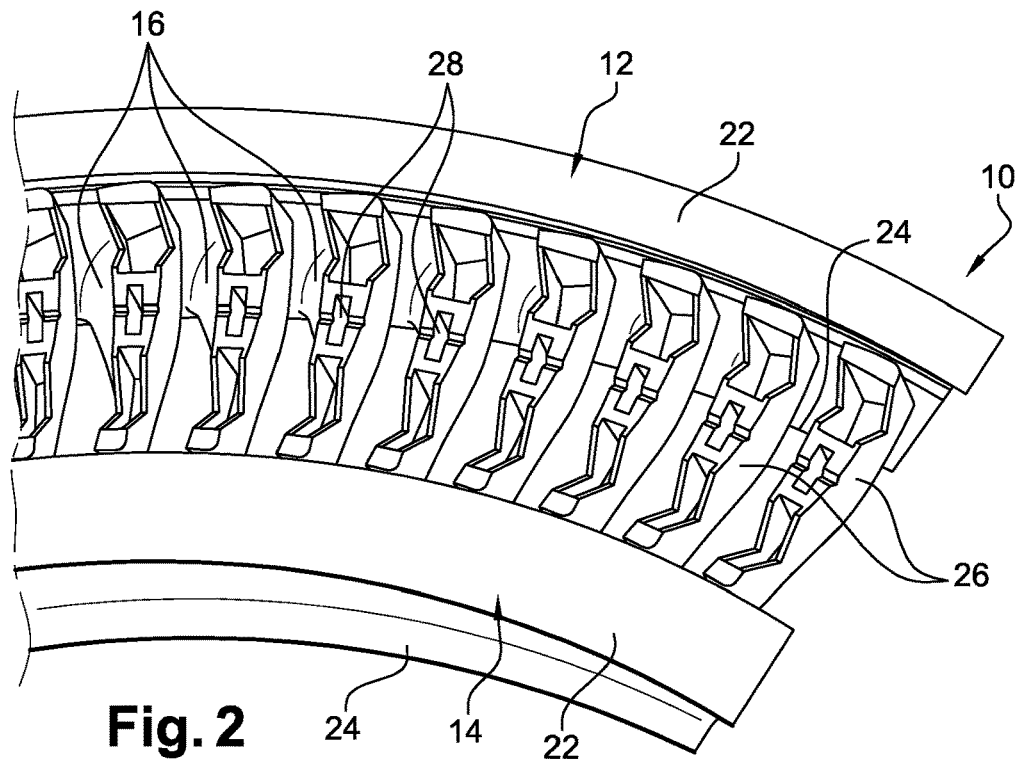
FIG. 2 is a schematic perspective view of a rectifier sector produced by additive manufacturing, the rectifier being in conformity with the invention.
Figure 3:
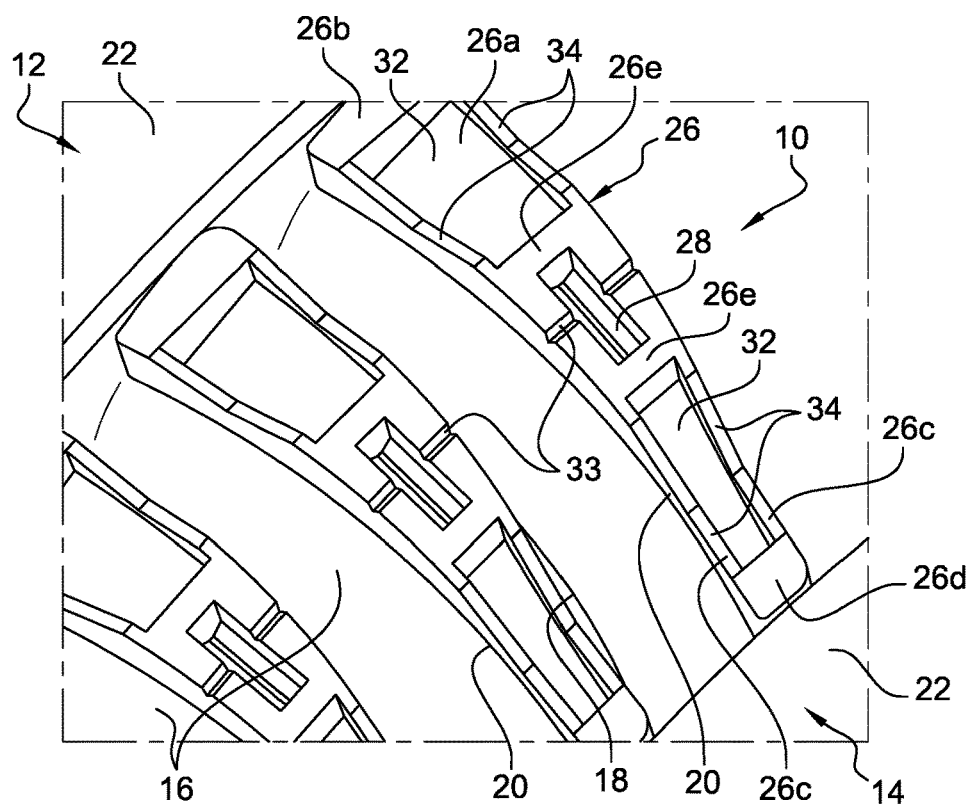
FIG. 3 is a larger scale view of part of the rectifier sector of FIG. 2, FIGS. 4a to 4d are schematic views in perspective of a rectifier sector and illustrate a manual step of removing the rectifier support members.

The invention uses additive manufacturing by laser fusion on powder beds to produce a turbomachine rectifier sector 10. FIG. 2 shows an embodiment of the invention. This rectifier sector 10 comprises two circumferential walls, respectively upper 12 and lower 14, between which extend vanes 16 each having a leading edge 18 and a trailing edge 20 extending between walls 12, 14 and at least partially retracted with respect to first and second circumferential edges 22, 24 of these walls respectively. Temporary support members 26 are located at the level of the leading edges 18 or trailing edges 20 of the 16 vanes, and extend between a plane passing through the first or second edges 22, 24 and the leading edges 18 or trailing edges 20 of the vanes. As shown in the drawings, each of the support members 26 comprises at least one recess 28 configured to receive at least one end of a tool 30 such as the free end of a flat screwdriver, for the pivoting removal of this member 26.

Figure 5:
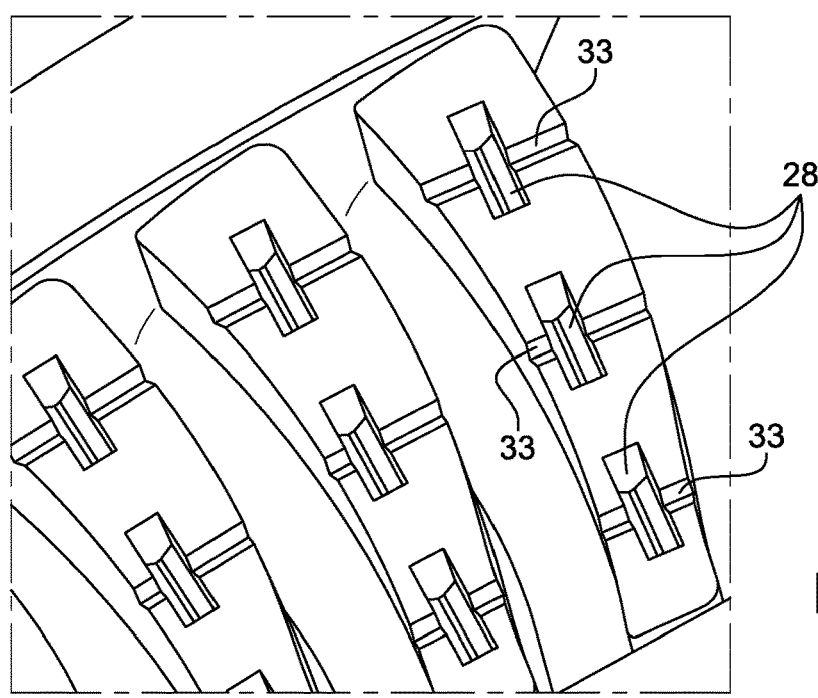
FIG. 5 is a view corresponding to FIG. 3 and representing a variant of embodiment of the invention.

In the example of embodiment of FIGS. 2 to 4d, the member 26 comprises a recess 28 but it could include several, such as three in the embodiment variant of FIG. 5.

Each member 26 is elongated in shape and extends longitudinally between walls 12, 14. In the example shown, its transverse thickness, located on the side of the upper wall 12, is larger than that of its lower end, located on the side of the lower wall 14.

Each member 26 comprises an elongated bottom wall 26a extending in a plane substantially parallel to the edges 22, 24, and connected to peripheral walls 26b, 26c, 26d substantially perpendicular to the bottom wall 26a. The upper wall 26b is located on the side of the upper wall 12, the lower wall 26d is located on the side of the lower wall 14, and the side walls 26c extend distance from each other, between the walls 12 and 14.

The recess 28 is located substantially in the middle of the member 26 and is delimited by the side walls 26c on the one hand, and by two transverse reinforcing walls 26e on the other hand. Each recess 28 has an elongated shape, along the elongation axis of the member, and is shaped to receive the tip of tool 30. Between the recess 28 and the walls 26b, 26d, the member comprises, between the walls 26c, lightening cavities 32. The walls 26c include, at the level of these cavities 32, lightening notches 34. These notches have a general V-shape here.

The portions of walls 26c delimiting the recesses 28 are over-thick compared to the rest of these walls. In addition, these wall portions 26c comprise transverse notches 33 configured to facilitate the de-powdering, i.e. the removal of the powder located in the recess 28 at the end of the additive manufacturing operation. The walls 26e are also over-thick, particularly compared to the above-mentioned rest of the walls 26c.

In the event that the first edges 22, such as the downstream edges (by reference to the flow of gases in the turbomachine), are made first during the additive manufacturing, it is understood that the downstream face of the rectifier would be the lower face that would be in contact with the support plate 180 in FIG. 1. The trailing edges of the vanes would be oriented towards the support plate 180.

In this case, the support members 26 are made simultaneously with the edges 22, by additive manufacturing, and ensure the support of the vanes 16 to avoid their collapse. They are thus intended to extend between the plate 180 and the trailing edges of the vanes in the example shown. They are supported here by the walls 26b, 26c, 26d on the support plate 180, and connected by continuity of material to the vanes 16, by their walls 26a.

According to the invention, the removal of each support member 26 is carried out by means of tool 30, at least one end of which is engaged in the recess of each of the support members 26, and which is pivoted in a plane substantially perpendicular to the associated leading (or trailing) edge.

FIGS. 4a to 4d illustrate steps for removing a last member 26 from a rectifier sector 10, the other members having already been removed. The tip of the tool 30 is inserted into the recess 28 of the member 26 (FIG. 4a), then the tool 30 is pivoted in the above-mentioned plane until the material breaks between the trailing edge of the vane and the member 26 (FIGS. 4b and 4c). The member is pivoted and lifted by the tool away from the vane and out of the space between the walls 12, 14 of the rectifier sector.

With the invention, the risk of deformation of the member 26 is limited. In addition, the removal operation is facilitated because it is quick and repeatable due to the precise positioning of the tool in the member.

In the particular case of the variant in FIG. 5, the member 26 comprises three recesses 28 aligned in the same parallel plane with the axis of elongation of the member, and the tool for removing this type of member may have three ends or tips to be inserted into the recesses of the member respectively. This allows the removal forces of the member to be distributed over its length.

Although the invention has been illustrated with reference to a rectifier sector, it applies to a distributor sector. In the example shown, the sector includes several vanes. Alternatively, it could comprise only one, this single vane forming a vane with the walls 12 and 14. In other words, the invention is applicable to a single vane or to a sector, i.e. to any monobloc assembly comprising walls 12, 14 between which one or more vanes 16 extend.

The invention claimed is:

1. A method of creating an aircraft turbomachine vane assembly using additive manufacturing, the aircraft turbomachine vane assembly comprising upper and lower circumferential walls, between which extend at least one vane comprising a leading edge and a trailing edge that are at least partially retracted with respect to first and second circumferential edges of said upper and lower circumferential walls, respectively, the method comprising:

an additive manufacturing step by laser fusion on a powder bed of said at least one vane, the additive manufacturing being carried out on a support plate so that said first or second circumferential edges are manufactured first directly on said support plate, at least one temporary support member comprising at least one lightening cavity and being produced simultaneously with said first or second circumferential edges at a level of said at least one vane and extending between said support plate and said leading or trailing edges of the at least one vane, and a step of removing said at least one temporary support member by breaking a connection with the leading or trailing edge with a tool, wherein at least one end of said tool is engaged in at least one recess of said at least one temporary support member, wherein a plurality of side walls delimit a portion of said at least one recess, wherein each side wall of the plurality of side walls comprises a de-powdering notch formed therein, and wherein said tool is moved by pivoting in a plane perpendicular to the leading or trailing edge.

2. The method according to claim 1, wherein the additive manufacturing step and the step of removing said at least one temporary support member are performed on a series of vanes belonging to a same distributor or rectifier sector.

3. The method according to claim 1, wherein said tool is a screwdriver.

4. An aircraft turbomachine vane assembly, comprising;

upper and lower circumferential walls, between which extend at least one vane comprising a leading edge and a trailing edge that are at least partially retracted with respect to first and second circumferential edges of said upper and lower circumferential walls, respectively; and at least one temporary support member being located at a level of the leading or trailing edge of said at least one vane and extending between a plane passing through said first or second circumferential edges and said leading or trailing edge of said at least one vane, wherein said at least one temporary support member comprises at least one recess configured to receive at least one end of a tool, for the pivoting removal of said temporary support member, wherein the at least one temporary support member comprises at least one lightening cavity, wherein a plurality of side walls delimit a portion of said at least one recess, wherein each side wall of the plurality of side walls comprises a de-powdering notch formed therein.

5. The aircraft turbomachine vane according to claim 4, wherein the at least one recess is partially delimited by a plurality of transverse reinforcing walls.

6. The aircraft turbomachine vane according to claim 4, wherein the at least one temporary support member has a thickness that varies between an end located on a side of the lower circumferential wall and an opposite end located on a side of the upper circumferential wall.

7. The aircraft turbomachine vane according to claim 4, wherein each side wall of the plurality of side walls comprises a lightening notch.

8. The aircraft turbomachine vane according to claim 7, wherein said lightening notch of each of the plurality of side walls has a V-shape.

9. A distributor or rectifier sector, comprising a series of aircraft turbomachine vane assemblies according to claim 4, said distributor or rectifier sector forming a monoblock assembly.

* * * * *